Patented Sept. 4, 1934

1,972,599

UNITED STATES PATENT OFFICE

1,972,599

METHOD OF MAKING TERTIARY ALKYL PHENOLS

Ralph P. Perkins, Andrew J. Dietzler, and Joseph T. Lundquist, Midland, Mich., assignors to The Dow Chemical Company, Midland, Mich., a corporation of Michigan No Drawing. Application July 22, 1932, Serial No. 624,046

22 Claims. (Cl. 260—154)

The present invention concerns an improved method of making tertiary-alkyl-phenols and certain new compounds prepared by such method.

In a co-pending application, Serial Number 571,856, filed October 29, 1931, we have described an improved general method of making tertiary-alkyl-phenols. Such method comprises reacting a tertiary-alkyl halide with a phenol in the presence of aluminum chloride or other catalyst effective in promoting a Friedel-Crafts reaction, passing hydrogen halide liberated from the reaction into a tertiary alcohol corresponding to the tertiary-alkyl halide first used, whereby additional tertiary-alkyl halide is formed, separating the latter from water formed during its preparation, and employing the tertiary-alkyl halide product as a reactant in forming additional tertiary-alkyl-phenol. Through such improved mode of operation loss of tertiary-alkyl halide, which is vaporized from the reaction mixture along with the hydrogen halide liberated during reaction, is prevented; the hydrogen halide product from the initial reaction is utilized in such manner that the halogen is re-used continuously for the production of the desired tertiary-alkyl-phenol; a tertiary alcohol rather than the corresponding tertiary-alkyl halide is used as a raw material for the reaction; and the amount of acid-proof apparatus required for carrying out the reaction is reduced materially.

The present invention comprises a further development of the above described improved mode of operation. We have now found that when a tertiary-alkyl halide, e. g. tertiary butyl chloride, is reacted with a phenol, having the general formula

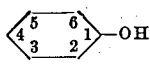

wherein the 2 and 4 positions of the benzene nucleus are free and wherein said nucleus may bear halogen, or primary or secondary alkyl substituents, in the presence of a catalyst and at a temperature between about 50° and 200° C., there is formed the corresponding 4-tertiary-alkyl-phenolic compound along with appreciable quantities of the corresponding 2-tertiary-alkyl-phenolic compound and 2,4-di-tertiary-alkyl-phenolic compound. The last mentioned products constitute a new class of organic compounds which are valuable germicides, fungicides, preservatives, etc., and which may also be employed as reactants in preparing other valuable organic compounds. A reaction mixture containing the above mentioned compounds may be separated into its various components by fractional distillation thereof, by fractional crystallization from an organic solvent, by fractional crystallization of metal salts of said compounds from aqueous solution, and by combinations of such operations.

We have further found that a 2-tertiary-alkyl-phenolic compound may be heated, in the presence of a catalyst capable of promoting the above described general reaction, to form the corresponding 4-tertiary-alkyl-phenolic compound and 2,4-di-tertiary-alkyl-phenolic compound. In similar manner, a 4-tertiary-alkyl-phenolic compound may be heated in the presence of a catalyst to form the corresponding 2,4-di-tertiary-alkyl-phenolic compound and phenol as major reaction products along with a relatively small quantity of the 2-tertiary-alkyl-phenolic compound. We have also found that a 2,4-di-tertiary-alkyl-phenolic compound may be reacted, in the presence of a catalyst, with a corresponding phenolic compound containing no tertiary-alkyl substituents, to form the corresponding 4-tertiary-alkyl-phenolic compound as the major reaction product.

The general reactions described above are illustrated by the following equations for the preparation of various tertiary-butyl-phenols in the presence of aluminum chloride as a catalyst:—

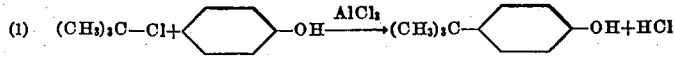

and appreciable quantities of

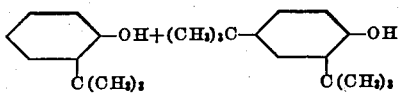

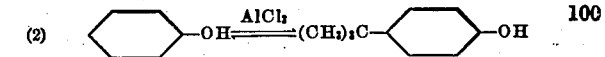

and some

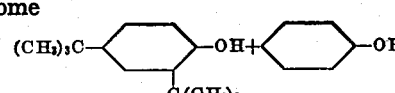

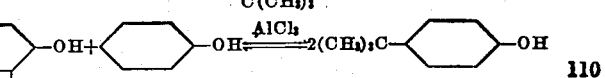

Equation 1, above, illustrates the fact that when a tertiary-alkyl halide is reacted with a phenol in the presence of a catalyst, and the reaction be carried out at a temperature between about 50° and 200° C., a 4-tertiary-alkyl-phenol is formed as a major reaction product along with the corresponding 2-tertiary-alkyl-phenol and 2,4-di-tertiary-alkyl-phenol as minor products. According to Equation 2 a 2-tertiary-alkyl-phenol may be converted to the corresponding 4-tertiary-alkyl-phenol as major reaction product along with 2,4-di-tertiary-alkyl-phenol and phenol as minor products, the conversion being accomplished through heating to a temperature between about 50° and 200° C. in the presence of a catalyst. Equation 2 also shows that such reaction is reversible and that under similar reaction conditions such products may, at least partially, be converted back to a 2-tertiary-alkyl-phenol. According to Equation 3, when a 2,4-di-tertiary-alkyl-phenol is heated with phenol to a temperature between about 50° and 200° C., a 4-tertiary-alkyl-phenol is formed as major product. Such reaction, also, is reversible and under similar reaction conditions a 4-tertiary-alkyl-phenol may be converted into phenol and a 2,4-di-tertiary-alkyl-phenol.

Equations 2 and 3, above, have been written as descriptive of equilibrium reactions. However, various reactants in each of said equations are gradually degraded into tars under the raction conditions maintained, so that it is extremely difficult, if not impossible, to maintain a true state of equilibrium in any reaction of a class illustrated by either Equation 2 or 3.

As previously pointed out, the above described reactions 2 and 3, may be carried out individually or may be made to take place during or subsequent to the condensation of a tertiary-alkyl halide with a phenol. Thus in preparing a 4-tertiary-alkyl-phenol, the yield thereof may be increased materially by returning the corresponding 2-tertiary-alkyl-phenol and 2,4-di-tertiary-alkyl-phenol from previous runs to the reaction. Furthermore, we may prepare either a 2-tertiary-alkyl-phenol, a 4-tertiary-alkyl-phenol, or a 2,4-di-tertiary-alkyl-phenol in increased yield through separating the desired reaction product and returning the undesired products to the reaction.

The present invention, then, consists in an improved method of making tertiary-alkyl substituted phenols, having the general formula

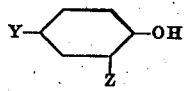

wherein at least one of the substituents Y and Z represents a tertiary-alkyl substituent and Y and Z may each represent hydrogen or a tertiary-alkyl substituent, and wherein the benzene nucleus may further bear halogen, primary alkyl, or secondary alkyl substituents, and the invention further consists in certain new compounds, having the general formula

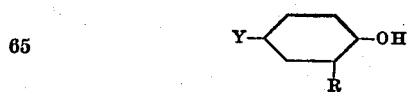

wherein R represents a tertiary-alkyl substituent and Y represents hydrogen or the same tertiary-alkyl substituent, and wherein the benzene nucleus may further bear halogen, primary alkyl, or secondary alkyl substituents, said method and new compounds being hereinafter fully described and particularly pointed out in the claims.

The following description and examples set forth in detail but several of the various ways in which the principle of our invention may be employed. It is to be understood, however, that said detailed description and examples are purely illustrative and are not to be construed as a limitation on the invention.

Our improved method comprises a cyclic mode of operation consisting of the following principal stages:—

(1) A tertiary-alkyl halide and a phenol are reacted in the presence of a catalyst and the reaction mixture is maintained at a temperature between about 50° and 200° C. to form a mixture consisting of a 4-tertiary-alkyl-phenol as principal product and a 2-tertiary-alkyl-phenol and a 2,4-di-tertiary-alkyl as minor products;

(2) the hydrogen halide, containing some tertiary-alkyl halide, which is evolved during such condensation, is absorbed in a tertiary alcohol corresponding to the tertiary-alkyl halide employed as a reactant in stage (1), whereby an additional quantity of the halide is formed and returned to stage (1) as the tertiary-alkyl halide therein;

(3) the organic reaction products from stage (1) are fractionally distilled or otherwise treated to separate the desired reaction product or products, the other products being returned to stage (1) wherein they are further reacted to form an additional quantity of the desired product.

In preparing 4-tertiary-butyl-phenol according to such general method, a mixture consisting of phenol and tertiary-butyl-chloride together with a catalyst, in amount representing between about 0.25 and 5 per cent of the weight of phenol used, is reacted, preferably with stirring, at a temperature between about 50° and 200° C. Among the catalysts which may be employed in such manner are aluminum chloride, ferric chloride, and bleaching earths (e. g. tonsil, filtrol, and other acid-activated earths) or, in fact, any catalyst capable of promoting reaction between an alkyl halide and phenol. During the reaction hydrogen chloride is evolved rapidly and may carry with it a considerable portion of the butyl chloride introduced to the reaction. Such acid vapors are led to a second reactor where they are absorbed in a body of tertiary-butyl-alcohol. The acid reacts directly with the alcohol at ordinary temperatures to produce additional tertiary-butyl-chloride, while tertiary-butyl-chloride vapors accompanying the acid are condensed therein. At the beginning of the absorption the temperature of the liquid may be allowed to vary between room temperature and 60°–70° C., but as the conversion of the alcohol to chloride approaches completion, the mixture should be cooled to a temperature materially below the boiling point of the chloride, i. e. 51° C., preferably to about 20°–30° C.

Theoretically, sufficient hydrogen chloride is given off in the principal reaction to produce, by reaction with the alcohol, an amount of butyl chloride equal to that reacted in the first instance. In practice, however, some acid must be added from another source to make up for losses in order to complete the cycle of operations and maintain a balance between the various reacting materials. In the reaction of the acid and alcohol water is produced, which is eliminated from the system as a solution of hydrogen chloride, thus accounting for a part of the losses of the latter. The butyl chloride produced in the second stage of the cycle is separated from the aqueous layer and may then be returned to the first stage for reaction with phenol.

After the reaction in the first stage described above is substantially completed, the reaction mixture may be treated in any of the usual ways to remove the catalyst therefrom. For instance, when either aluminum or ferric chloride is employed as a catalyst, such mixture may be extracted with a relatively small quantity of an aqueous strong mineral acid, such as hydrochloric acid or sulphuric acid, or the mixture may be treated with a relatively small quantity of an aqueous basic compound (e. g. sodium hydroxide, sodium carbonate, potassium carbonate, etc.) and then be filtered to separate aluminum or ferric compounds as a residue. The organic mixture is then fractionally distilled or otherwise treated, to separate the same into its various components, e. g. 4-tertiary-butyl-phenol, 2-tertiary-butyl-phenol, and 2,4-di-tertiary-butyl-phenol. When 4-tertiary-butyl-phenol is the product desired, the other products, e. g. 2-tertiary-butyl-phenol and 2,4-di-tertiary-butyl-phenol may be returned to the first stage of the reaction described above, wherein they may be further reacted to form an additional quantity of 4-tertiary-butyl-phenol. If 2,4-di-tertiary-butyl-phenol is the desired product, the mono-tertiary-butyl-phenols obtained are returned to the initial stage of the reaction, where they are further reacted to form additional 2,4-di-tertiary-butyl-phenol. In general, for the production of either 2-tertiary-butyl-phenol, 4-tertiary-butyl-phenol, or 2,4-di-tertiary-butyl-phenol in maximum yield according to the method described above, by-products from the reaction may be returned to the first stage of said reaction, wherein they are at least partially converted into the desired product.

As alternative procedures to that described above the following may be carried out, namely:—(1) 2-tertiary-butyl-phenol, separated from the products of the initial reaction described above, may be heated to a temperature between about 50° and 200° C. with between, preferably, 0.25 and 5 per cent of its weight of one of the previously mentioned catalysts to form an additional quantity of 4-tertiary-butyl-phenol along with some 2,4-di-tertiary-butyl-phenol; (2) 4-tertiary-butyl-phenol may be heated with a catalyst under similar conditions to form 2,4-di-tertiary-butyl-phenol and phenol along with a relatively small quantity of 2-tertiary-butyl-phenol; and (3) 2,4-di-tertiary-butyl-phenol may be heated with phenol and one of the previously mentioned catalysts to form 4-tertiary-butyl-phenol along with a relatively small quantity of 2-tertiary-butyl-phenol.

In the foregoing general description, we have set forth as stage 2 of our cyclic mode of operation the steps of absorbing the hydrogen chloride, liberated during the principal reaction, in tertiary-butyl-alcohol to form additional tertiary-butyl-chloride and returning the latter to said principal reaction. If desired, the second stage of such cyclic mode of operation may be eliminated; i. e. the hydrogen chloride from the principal reaction may be passed through a condenser so as to separate tertiary-butyl-chloride vapors therefrom, the condensed butyl chloride be returned to the principal reaction, and the hydrogen chloride may be obtained as a by-product.

While, for the sake of clarity, the foregoing detailed description has been restricted to the preparation and inter-conversion of various tertiary-butyl-phenols, the modes of operation described are equally applicable to the preparation and inter-conversion of other tertiary-alkyl-phenols, e. g. tertiary-amyl-phenols, tertiary-hexyl-phenols, etc.

The following examples set forth in detail several ways in which the principle of our invention has been applied.

*Example 1*

A mixture consisting of approximately equimolecular quantities of tertiary-butyl-chloride and phenol, together with aluminum chloride in amount representing about 1 per cent of the weight of phenol used, was reacted with stirring. The reaction started at about 15° C. and the temperature of the mixture was gradually raised to 100° C. during the course of the reaction. After the reaction was substantially completed, the mixture was allowed to cool to about 90° C., agitated with about 4 per cent of its weight of a 50 per cent aqueous sodium carbonate mixture, and filtered while hot. The filtrate was distilled through a fractionating column, there being obtained 10.5 per cent of the weight of the crude reaction mixture as unreacted phenol, 1.2 per cent as 2-tertiary-butyl-phenol, 70.2 per cent as 4-tertiary-butyl-phenol, and 7.1 per cent as 2,4-di-tertiary-butyl-phenol.

2-tertiary-butyl-phenol is a nearly colorless liquid boiling at approximately 117.1° C. under 23.5 millimeters pressure and boiling at about 144.7° C. under 71.5 millimeters pressure. 2,4-di-tertiary-butyl-phenol is a white crystalline solid having a freezing point of approximately 56.5° C. and boiling at about 147.8° C. under 23.5 millimeters pressure and at about 170° C. under 55.5 millimeters pressure.

*Example 2*

A mixture consisting of 34.75 parts by weight of tertiary-amyl-chloride, 24.5 parts of phenol, and 1.5 parts of aluminum chloride was stirred and reacted at about room temperature. Toward the end of the reaction the mixture was heated to about 100° C. The hot reaction mixture was then agitated with a mixture consisting of 7 parts of anhydrous sodium carbonate and 4 parts of water, then filtered. The filtrate was diluted with six parts of benzene and cooled to room temperature, thereby crystallizing 4-tertiary-amyl-phenol from the solution. The mixture was filtered and the filtrate fractionally distilled, there being obtained 0.14 parts, by weight, of 2-tertiary-amyl-phenol and 3 parts of 2,4-di-tertiary-amyl-phenol.

2-tertiary-amyl-phenol is a practically colorless liquid boiling at about 130°–131° C. under 25 millimeters pressure. 2,4-di-tertiary-amyl-phenol is a white crystalline solid having a melting point of about 27° C and boiling at about 169°–170° C. under 22 millimeters pressure.

*Example 3*

A mixture consisting of 150 grams (1.0 mol) of 2-tertiary-butyl-phenol and 7.5 grams of aluminum chloride was stirred and heated to 60° C. At about said temperature an exothermic reaction set in, the temperature of the mixture rising spontaneously to about 80° C. After maintaining the mixture at 80° C. for about 20 minutes, the mixture was heated to, and maintained at, a temperature between 90° and 95° C. for 1 hour. The reaction mixture was then neutralized with aqueous sodium carbonate, filtered, and the filtrate was fractionally distilled. There was obtained 94.3 grams (0.628 mol) of substantially pure 4-tertiary-butyl-phenol and relatively small quantities of phenol, 2,4-di-tertiary-butyl-phenol, and unreacted 2-tertiary-butyl-phenol. The yield of 4-tertiary-butyl-phenol was 62.8 per cent of theoretical.

Example 4

A mixture consisting of 102.5 grams (0.5 mol) of 2,4-di-tertiary-butyl-phenol and 56.5 grams (0.6 mol) of phenol was heated, with stirring, to 60° C. and 5.2 grams of aluminum chloride was added to the mixture. Stirring was continued and the mixture was gradually heated to 100° C. during a period of 1 hour and fifty minutes. The reacted mixture was then neutralized with aqueous sodium carbonate, filtered, and the filtrate was fractionally distilled. There was obtained 111.5 grams (0.74 mol) of substantially pure 4-tertiary-butyl-phenol and relatively small quantities of 2-tertiary-butyl-phenol and unreacted 2,4-di-tertiary-butyl-phenol. The yield of 4-tertiary-butyl-phenol amounted to 74.5 per cent of theoretical, based on the quantity of 2,4-di-tertiary-butyl-phenol used.

Example 5

A mixture consisting of 234 grams (1 mol) of 2,4-di-tertiary-amyl-phenol, 113 grams (1.2 mols) of phenol, and 5.6 grams of aluminum chloride was heated gradually from 35° to 110° C. during a period of 55 minutes. The mixture was then neutralized with aqueous sodium carbonate, filtered, and the filtrate was fractionally distilled. There was obtained 227 grams (1.38 mols) of substantially pure 4-tertiary-amyl-phenol and relatively small quantities of unreacted phenol and 2,4-di-tertiary-amyl-phenol. The yield of 4-tertiary-amyl-phenol amounted to 69.2 per cent of theoretical, based on the quantity of 2,4-di-tertiary-amyl-phenol used.

Example 6

A mixture consisting of 92.5 grams (1 mol) of tertiary-butyl-chloride, 94 grams (1 mol) of phenol, 150 grams (1 mol) of 2-tertiary-butyl-phenol, and 6 grams of aluminum chloride was stirred and maintained at about 25° C. for 1 hour. Stirring was continued and the mixture was gradually heated to 100° C. during an additional 45 minute period. The mixture was then neutralized through stirring the same with a mixture consisting of 10 cubic centimeters of water and 22 grams of anhydrous sodium carbonate, after which it was filtered and the filtrate was fractionally distilled. There was obtained 224 grams (1.49 mols) of 4-tertiary-butyl-phenol, 13 grams (0.087 mol) of 2-tertiary-butyl-phenol, and 15 grams (0.073 mol) of 2,4-di-tertiary-butyl-phenol. The 4-tertiary-butyl-phenol was obtained in 74.5 per cent of the theoretical yield, based on the combined quantities of phenol and 2-tertiary-butyl-phenol used.

Example 7

A mixture consisting of 300 grams (2.0 mols) of pure 4-tertiary-butyl-phenol and 9 grams of tonsil was heated in a still, under 23 millimeters absolute pressure, until 87.5 grams (0.92 mol) of phenol had been fractionally distilled from the mixture. The residue from the above fractional distillation was filtered and fractionally distilled, there being separated an additional 5 grams (0.05 mol) of phenol, 91 grams (0.61 mol) of unreacted 4-tertiary-butyl-phenol, and 87 grams (.42 mol) of 2,4-di-tertiary-butyl-phenol. During reaction, some isobutylene was given off from the mixture. The yield of di-tertiary-butyl-phenol was 42 per cent of theoretical, based on the quantity of 4-tertiary-butyl-phenol used.

Example 8

A mixture consisting of 1300 grams (12 mols) of ortho-cresol, 1280 grams of tertiary-butyl-chloride, and 22 grams of aluminum chloride was stirred and maintained at between 25° and 30° C. After stirring for 2 hours, an additional 320 gram quantity of tertiary-butyl-chloride was added and after an additional 5 hours of stirring another 320 gram portion of tertiary-butyl-chloride was added. A total of 1920 grams (20.8 mols) of tertiary-butyl-chloride was employed. The reaction mixture was stirred at 25° to 30° C. for a total period of 22 hours, after which stirring was continued and the temperature of the mixture was gradually raised to 105° C. during an additional 6 hour period. The mixture was then agitated with aqueous sodium carbonate, containing 86 grams of anhydrous sodium carbonate and 55 grams of water, and filtered. The filtrate was fractionally distilled. There was obtained 13 grams (0.12 mol) of unreacted ortho-cresol; 1257 grams (7.65 mols) of 4-tertiary-butyl-6-methyl-phenol, boiling at 138°-139° C. under 25 millimeters pressure; 528 grams (2.40 mols) of substantially pure 2,4-di-tertiary-butyl-6-methyl-phenol, boiling at 156.5° to 157.5° C. under 25 millimeters pressure and freezing at about 50.9° C. when completely purified; and 154 grams of mixed fractions. The compound 2-tertiary-butyl-6-methyl-phenol was not isolated in pure form, but was present in amount estimated as between 1 and 2 per cent of the weight of the combined reaction products. Due to the fact that 2-tertiary-butyl-6-methyl-phenol boils at approximately 135.5° C. under 25 millimeters pressure, it may be fractionally distilled completely from 4-tertiary-butyl-6-methyl-phenol (boiling point 138°-139° C. under 25 millimeters pressure) only with difficulty. The yield of 4-tertiary-butyl-6-methyl-phenol was 63.7 per cent of theoretical, and the yield of 2,4-di-tertiary-butyl-6-methyl-phenol was 20 per cent of theoretical, each of said yields being based on the quantity of ortho-cresol employed in the reaction.

The principle of our invention may be practiced in ways other than those heretofore described. Other tertiary-alkyl halides, e. g. tertiary-butyl-bromide, tertiary-butyl-iodide, tertiary-amyl-bromide, a tertiary-hexyl-chloride, etc., may be employed as reactants in preparing tertiary-alkyl-phenols according to the present method. Other phenolic compounds, e. g. 3-methyl-phenol, 2,3-dimethyl-phenol, 2,5-dimethyl phenol, 2,3,5-trimethyl-phenol, 2-ethyl-phenol, 2-chloro-phenol, 2,5-dichloro-phenol, 2-isopropyl-phenol, 2-secondary-butyl-phenol, etc., may be employed as reactants in preparing tertiary-alkyl-phenolic compounds according to the method herein described.

In each of the specific examples, all components of a reaction mixture were first mixed, then reacted. We frequently find it advantageous, however, to add one of the reactants slowly during the course of a reaction. For instance, when tertiary-butyl-chloride and phenol are reacted in large quantities, the speed of reaction may be controlled by first mixing phenol with the desired catalyst, then adding the tertiary-butyl-chloride gradually during the course of the reaction. If desired, a relatively inert solvent, e. g. carbon bisulfide, benzene, etc., may be employed as a reaction medium in carrying out a reaction for the production of a tertiary-alkyl-phenol according to the present method.

It has previously been pointed out that the principal reactions involved in the present method may be carried out at any temperature between about 50° and about 200° C. In practice, however, we find such reactions to proceed most smoothly and with minimum irrecoverable by-product (tar) formation when carried out at a temperature between about 80° and 120° C.

Reactions of the class herein disclosed may be carried out under atmospheric, subatmospheric, or superatmospheric pressure. Due to the fact that olefines, e. g. isobutylene, etc., are sometimes lost from a reaction mixture apparently as intermediate products, it frequently is advantageous to carry such reactions out under pressures above atmospheric.

The present invention, in brief, comprises an improved method of preparing a tertiary-alkyl-phenolic compound through reacting a tertiary-alkyl halide with a phenol in the presence of aluminum chloride, ferric chloride, or a bleaching earth as catalyst, separating the desired tertiary-alkyl-phenolic product, and returning undesired tertiary-alkyl-phenolic products to the reaction, wherein they are further reacted to form an additional quantity of the desired product, and the present invention further comprises a new class of organic compounds prepared by such method.

Other modes of applying the principle of our invention may be employed instead of those explained, change being made as regards the method and compounds herein disclosed, provided the steps or compounds stated by any of the following claims or the equivalent of such stated steps or compounds be employed.

We therefore particularly point out and distinctly claim as our invention:—

1. The method of simultaneously making a 4-tertiary-alkyl-phenol, a 2-tertiary-alkyl-phenol, and a 2,4-di-tertiary-alkyl-phenol of the benzene series which comprises reacting a tertiary-alkyl halide with a monohydric phenol of the benzene series, having the 2 and 4 positions thereof free, at a temperature between about 50° and about 200° C. in the presence of a catalyst capable of promoting reaction between an alkyl halide and phenol.

2. The method of simultaneously making a 4-tertiary-alkyl-phenol, a 2-tertiary-alkyl-phenol, and a 2, 4-di-tertiary-alkyl-phenol of the benzene series, which comprises reacting a tertiary-alkyl halide with a monohydric phenol of the benzene series, having the 2 and 4 positions thereof free, in the presence of a catalyst capable of promoting reaction between an alkyl halide and phenol, and heating the reaction mixture to a temperature between about 50° and about 200° C.

3. In a method of making a tertiary-alkyl-phenol, the steps which consist in reacting a tertiary-alkyl halide with a phenol, having the general formula

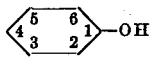

wherein the 2 and 4 positions of the benzene nucleus are free and wherein said benzene nucleus may bear substituents selected from the class consisting of halogen, primary alkyl, and secondary alkyl substituents, in the presence of a catalyst capable of promoting reaction between an alkyl halide and phenol and at a temperature between about 80° and about 120° C., separating the desired tertiary-alkyl-phenol product from the reaction mixture and returning other tertiary-alkyl-phenol products contained in said mixture to the reaction wherein they are further reacted to form an additional quantity of the desired product.

4. In a method of making a tertiary-alkyl-phenol, the steps which consist in reacting a tertiary-alkyl halide with a phenol, having the general formula

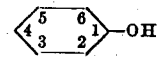

wherein the 2 and 4 positions of the benzene nucleus are free and wherein the benzene nucleus may bear a methyl substituent in one of the positions 3, 5, and 6 therein, at a temperature between about 50° and about 200° C. and in the presence of a catalyst capable of promoting reaction between an alkyl halide and phenol, passing the hydrogen halide liberated during reaction into a tertiary alcohol corresponding to the tertiary-alkyl halide employed as a reactant, whereby an additional quantity of said tertiary-alkyl halide is formed, and returning said additional tertiary-alkyl halide to the initial reaction, separating the desired tertiary-alkyl-phenol product from the initial reacted mixture and returning other tertiary-alkyl-phenol products contained in said mixture to the initial reaction wherein they are further reacted to form an additional quantity of the desired product.

5. In a method of making a tertiary-alkyl-phenol having the general formula

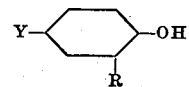

wherein R represents a tertiary-butyl or tertiary-amyl group and Y represents hydrogen or the same tertiary-alkyl substituent, the steps which consist in reacting the corresponding tertiary-alkyl halide with phenol at a temperature between about 50° and about 200° C. and in the presence of a catalyst capable of promoting reaction between an alkyl halide and phenol, passing the hydrogen halide liberated during reaction into a tertiary alcohol corresponding to the tertiary-alkyl halide employed as a reactant, whereby an additional quantity of said tertiary-alkyl halide is formed and returning said additional tertiary-alkyl halide to the reaction, separating the desired tertiary-alkyl-phenol product from the initial reacted mixture and returning other tertiary-alkyl-phenol products contained in said initial reacted mixture to the initial reaction wherein they are further reacted to form an additional quantity of the desired product.

6. In a method of making a tertiary-alkyl-phenol having the general formula

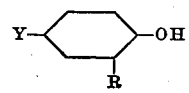

wherein R represents a tertiary-butyl or tertiary-amyl group and Y represents hydrogen or the same tertiary-alkyl substituent, the steps which consist in reacting the corresponding tertiary-alkyl halide with phenol at a temperature between about 50° and about 200° C. and in the presence of a catalyst selected from the class consisting of aluminum chloride, ferric chloride and bleaching earths, separating the desired tertiary-alkyl-phenol product and returning other tertiary-alkyl-phenol products contained in the reacted mix- 7. In a method of making a tertiary-alkyl-phenol having the general formula

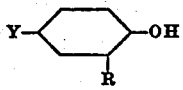

wherein R represents a tertiary-butyl or tertiary-amyl group and Y represents hydrogen or the same tertiary-alkyl group, the steps which consist in reacting the corresponding tertiary-alkyl halide with phenol at a temperature between about 80° and about 120° C. and in the presence of a catalyst capable of promoting reaction between an alkyl halide and phenol, passing hydrogen halide liberated during the above initial reaction into a tertiary alcohol corresponding to the tertiary-alkyl halide employed as a reactant, whereby an additional quantity of said tertiary-alkyl halide is formed, and returning said additional tertiary-alkyl halide to the initial reaction, separating the desired tertiary-alkyl-phenol product from the initial reacted mixture and returning other tertiary-alkyl-phenol products contained in said initial reacted mixture to the initial reaction wherein they are further reacted to form an additional quantity of the desired tertiary-alkyl-phenol product.

8. In a method of making a monohydric 4-tertiary-alkyl-phenol wherein the benzene nucleus may bear substituents selected from the class consisting of halogen, primary alkyl, and secondary alkyl substituents, the step which consists in heating the corresponding 2-tertiary-alkyl-phenol to a temperature between about 50° and about 200° C. in the presence of a catalyst capable of promoting reaction between an alkyl halide and phenol.

9. In a method of making a monohydric 4-tertiary-alkyl-phenol wherein the benzene nucleus may bear a methyl substituent in one of the positions 3, 5, and 6 with respect to the hydroxyl group, the step which consists in heating the corresponding 2-tertiary-alkyl-phenol to a temperature between about 50° and about 200° C. in the presence of a catalyst capable of promoting reaction between an alkyl halide and phenol.

10. In a method of making a monohydric 4-tertiary-alkyl-phenol, the step which consists in heating the corresponding 2-tertiary-alkyl-phenol to a temperature between about 80° and about 120° C. in the presence of a catalyst capable of promoting reaction between an alkyl halide and phenol.

11. In a method of making 4-tertiary-butyl-phenol, the step which consists in heating 2-tertiary-butyl-phenol to a temperature between about 80° and about 120° C. in the presence of a catalyst selected from the class consisting of aluminum chloride, ferric chloride, and bleaching earths.

12. In a method of making a monohydric 4-tertiary-alkyl-phenol, the step which consists in heating a 2,4-di-tertiary-alkyl-phenol, having the general formula

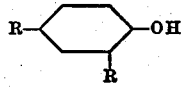

wherein R represents a tertiary-alkyl substituent and wherein the benzene nucleus may bear substituents selected from the class consisting of halogen, primary alkyl, and secondary alkyl substituents, with a corresponding phenol which bears no tertiary-alkyl substituent, to a temperature between about 50° and about 200° C. in the presence of a catalyst capable of promoting reaction between an alkyl halide and phenol.

13. In a method of making a monohydric 4-tertiary-alkyl-phenol, the step which consists in reacting a 2,4-di-tertiary-alkyl-phenol, having the general formula

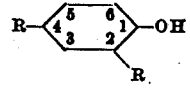

wherein R represents a tertiary-alkyl substituent selected from the class consisting of tertiary-butyl and tertiary amyl substituents and wherein the benzene nucleus may bear a methyl substituent in one of the positions 3, 5, and 6 with respect to the hydroxyl group, with a corresponding phenol which bears no tertiary-alkyl substituent, at a temperature between about 80° and about 120° C. and in the presence of a catalyst capable of promoting reaction between an alkyl halide and phenol.

14. In a method of making 4-tertiary-butyl-phenol, the step which consists in reacting 2,4-di-tertiary-butyl-phenol with phenol in the presence of a catalyst selected from the class consisting of aluminum chloride, ferric chloride, and bleaching earths, at a temperature between about 80° and about 120° C.

15. As a new compound, a tertiary-alkyl-phenol having the general formula

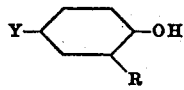

wherein R represents a tertiary-alkyl substituent and Y represents hydrogen or the same tertiary-alkyl substituent, and wherein the benzene nucleus may further bear substituents selected from the class consisting of halogen, primary alkyl, and secondary alkyl substituents.

16. As a new compound, a tertiary-alkyl-phenol, having the general formula

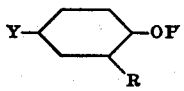

wherein R represents a tertiary-alkyl substituent selected from the class consisting of tertiary-butyl and tertiary-amyl substituents and Y represents hydrogen or the same tertiary-alkyl substituent.

17. As a new compound, a 2-tertiary-alkyl-phenol having the general formula

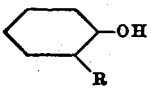

wherein R represents a tertiary-alkyl substituent selected from the class consisting of tertiary-butyl and tertiary-amyl substituents.

18. As a new compound, 2-tertiary-butyl-phenol, a liquid having a boiling point of approximately 117.2° C. under 23.5 millimeters pressure.

19. As a new compound, a 2,4-di-tertiary-alkyl-phenol, having the general formula

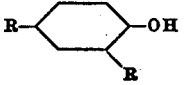

wherein R represents a tertiary-alkyl substituent selected from the class consisting of tertiary-butyl and tertiary-amyl substituents.

20. As a new compound, 2,4-di-tertiary-butyl-phenol, a white crystalline solid having a freezing point of approximately 56.5° C.

21. As a new compound, a 2,4-di-tertiary-alkyl-cresol, having the general formula

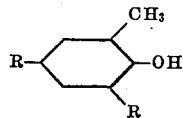

wherein R represents a tertiary-alkyl substituent selected from the class consisting of tertiary-butyl and tertiary-amyl substituents.

22. As a new compound, 2,4-di-tertiary-butyl-6-methyl-phenol, a white crystalline solid freezing at about 50.9° C.

RALPH P. PERKINS.
ANDREW J. DIETZLER.
JOSEPH T. LUNDQUIST.